(12) United States Patent
Gao et al.

(10) Patent No.: US 9,846,014 B2
(45) Date of Patent: Dec. 19, 2017

(54) BALLISTIC MATERIALS HAVING A THREE-DIMENSIONAL SPHERE STRUCTURE

(71) Applicants: Xiaosheng Gao, Copley, OH (US); Yibin Fu, Fairlawn, OH (US)

(72) Inventors: Xiaosheng Gao, Copley, OH (US); Yibin Fu, Fairlawn, OH (US)

(73) Assignee: THE UNIVERSITY OF AKRON, Akron ( * ) Notice: Subject to any disclaimer, the term of this patent is extended or adjusted under 35 U.S.C. 154(b) by 43 days.

(21) Appl. No.: 14/558,970

(22) Filed: Dec. 3, 2014

(65) Prior Publication Data

US 2016/0178325 A1  Jun. 23, 2016

Related U.S. Application Data

(60) Provisional application No. 61/911,122, filed on Dec. 3, 2013, provisional application No. 61/912,134, filed on Dec. 5, 2013.

(51) Int. Cl.
*F41H 5/04* (2006.01)

(52) U.S. Cl.
CPC ........ *F41H 5/0492* (2013.01); *B32B 2305/30* (2013.01); *B32B 2571/02* (2013.01)

(58) Field of Classification Search
CPC ........ F41H 5/0492; F41H 5/04; F41H 5/0414; F41H 5/0421; F41H 5/0442; B32B 2571/02; B32B 2305/30
USPC ........... 89/36.02, 36.01, 36.03, 36.04, 36.05; 428/156
See application file for complete search history.

(56) References Cited

U.S. PATENT DOCUMENTS

| | | | | |
|---|---|---|---|---|
| 3,431,818 A | * | 3/1969 | King ..................... | F41H 5/0414 109/80 |
| 3,523,057 A | * | 8/1970 | Buck ...................... | B29C 70/64 109/24 |
| 4,179,979 A | * | 12/1979 | Cook .................... | F41H 5/0414 109/49.5 |
| 5,134,725 A | * | 8/1992 | Yeshurun .............. | F41H 5/0435 2/102 |

(Continued)

OTHER PUBLICATIONS

Adam Sokolow et al., "Absorption of short duration pulses by small, scalable, tapered granular chains", Applied Physics Letters 87, 254104 (2005); doi: 10.1063/1.2149218; http://dx.doi.org/10.1063/1.2149218.

(Continued)

*Primary Examiner* — John Cooper
(74) *Attorney, Agent, or Firm* — Renner, Kenner, Greive, Bobak, Taylor & Weber Co. LPA

(57) ABSTRACT

A ballistic material utilizes a three-dimensional, square-based pyramid unit cell (SBPUC) sphere structure that includes four base spheres and a primary sphere, which are tightly packed and in contact with each other. The base spheres and the primary sphere are arranged whereby the centers of each of the base spheres form corners of a square base, while the center of the primary sphere forms an apex, which when connected to the corners, forms an imaginary pyramid. The ballistic material is formed from one or more layers of SBPUCs that are provided between a pair of spaced substrate layers, so as to achieve the desired level of ballistic protection performance.

21 Claims, 10 Drawing Sheets

(56) References Cited

U.S. PATENT DOCUMENTS

| | | | | |
|---|---|---|---|---|
| 5,364,679 | A * | 11/1994 | Groves | B32B 3/10 109/49.5 |
| 8,096,223 | B1 * | 1/2012 | Andrews | F41H 5/0492 89/36.02 |
| 9,060,560 | B2 * | 6/2015 | Greenhill | A42B 3/12 |
| 9,328,788 | B2 * | 5/2016 | Greenhill | F41H 1/04 |
| 2012/0247312 | A1 * | 10/2012 | Adams | F41H 5/0421 89/36.02 |
| 2013/0228067 | A1 * | 9/2013 | McElfresh | F41H 5/0457 89/36.02 |
| 2013/0273273 | A1 * | 10/2013 | Greenhill | F41H 1/04 428/34.1 |
| 2013/0340604 | A1 * | 12/2013 | Knies | F41H 5/04 89/36.02 |
| 2015/0233678 | A1 * | 8/2015 | Smith | F41H 1/02 89/36.02 |
| 2015/0237929 | A1 * | 8/2015 | Greenhill | F41H 1/08 428/328 |
| 2015/0377592 | A1 * | 12/2015 | Roland | F41H 5/0492 89/36.02 |
| 2016/0178325 | A1 * | 6/2016 | Gao | F41H 5/0492 89/36.02 |

OTHER PUBLICATIONS

Robert L. Doney et al., "Energy partitioning and impulse dispersion in the decorated, tapered, strongly nonlinear granular alignment: A system with many potential applications", Journal of Applied Physics 106, 064905 (2009); doi: 10.1063/1.3190485; http://dx.doi.org/10.1063/1.3190485.

H.B. Zeng et al., "Impact behaviour of hollow sphere agglomerates with density gradient", International Journal of Mechanical Sciences 52 (2010) 680-688; www.elsevier.com/locate/ijmecsci.

H.B. Zeng et al., "Perforation of sandwich plates with graded hollow sphere cores under impact loading", International Journal of Impact Engineering 37 (2010) 1083-1091; www.elsevier.com/locate/ijimpeng.

Yibin Fu et al., "Design and numerical simulation of a new sandwiched sphere structure for ballistic protection", International Journal of Impact Engineering 58 (2013) 66-75; www.elsevier.com/locate/ijimpeng.

* cited by examiner

BALLISTIC MATERIALS HAVING A THREE-DIMENSIONAL SPHERE STRUCTURE

CROSS-REFERENCE TO RELATED APPLICATIONS

This application claims the benefit of U.S. Provisional Application No. 61/911,122 filed on Dec. 3, 2013 and U.S. Provisional Application No. 61/912,134 filed on Dec. 5, 2013, the content of each of which is incorporated herein by reference.

TECHNICAL FIELD

Generally, the present invention relates to materials used for ballistic protection. In particular, the present invention relates to a three-dimensional sphere structure for forming ballistic materials. More particularly, the present invention relates to ballistic materials that utilize a three-dimensional, square-based pyramid unit cell (SBPUC) sphere structure.

BACKGROUND OF THE INVENTION

Conventional ballistic devices, such as bullet-proof vests and other projectile-resistant garments and devices, utilize monolithic materials or structures, such as a solid steel plate, to provide protection from an incoming projectile. However, such monolithic-type ballistic materials, generally direct the energy from the incoming projectile straight through the protecting layers, thereby perforating the material. As a result, such ballistic materials used in such protection devices are susceptible to failure and, therefore, require substantial reinforcement to achieve the necessary ballistic protection performance in the field. Such reinforcement efforts generally require that the cross-section of ballistic material be made substantially thick, which leads to ballistic protection devices that are heavy and as a result, are cumbersome and difficult to wear and use.

Therefore, there is a need for a ballistic material that can be used in ballistic protection devices, such as ballistic armor, bullet-proof suits, and the like that utilizes a three-dimensional sphere structure that is efficient in controlling and limiting the movement of a projectile through the material. In addition, there is a need for a ballistic material that utilizes a three-dimensional sphere structure that is lightweight. Furthermore, there is a need for a ballistic material that utilizes a three-dimensional sphere structure that is compatible with standard manufacturing processes.

SUMMARY OF THE INVENTION

In light of the foregoing, it is a first aspect of the present invention to provide a ballistic material comprising a first substrate layer; a second substrate layer; and at least one layer of a plurality of unit cells positioned between the first substrate layer and the second substrate layer, each unit cell comprising four base spheres, each base sphere being positioned adjacent to two other base spheres, such that a recess is defined by the four base spheres; and a primary sphere positioned partially within the recess and adjacent to each of the four base spheres.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1A:
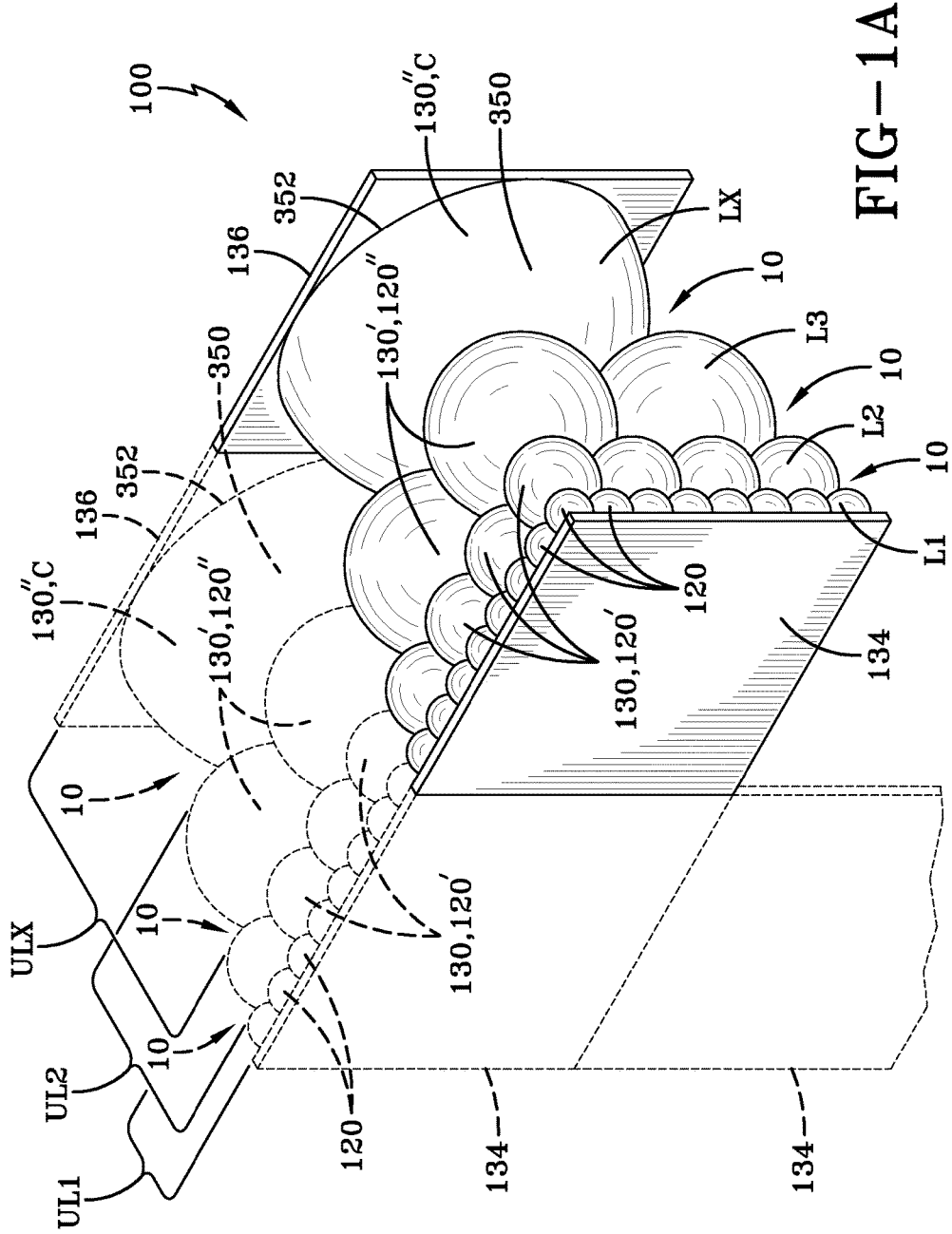
FIG. 1A is a perspective view of a ballistic material utilizing a square-based pyramid unit cell structure in accordance with the concepts of the present invention.
Figure 1B:
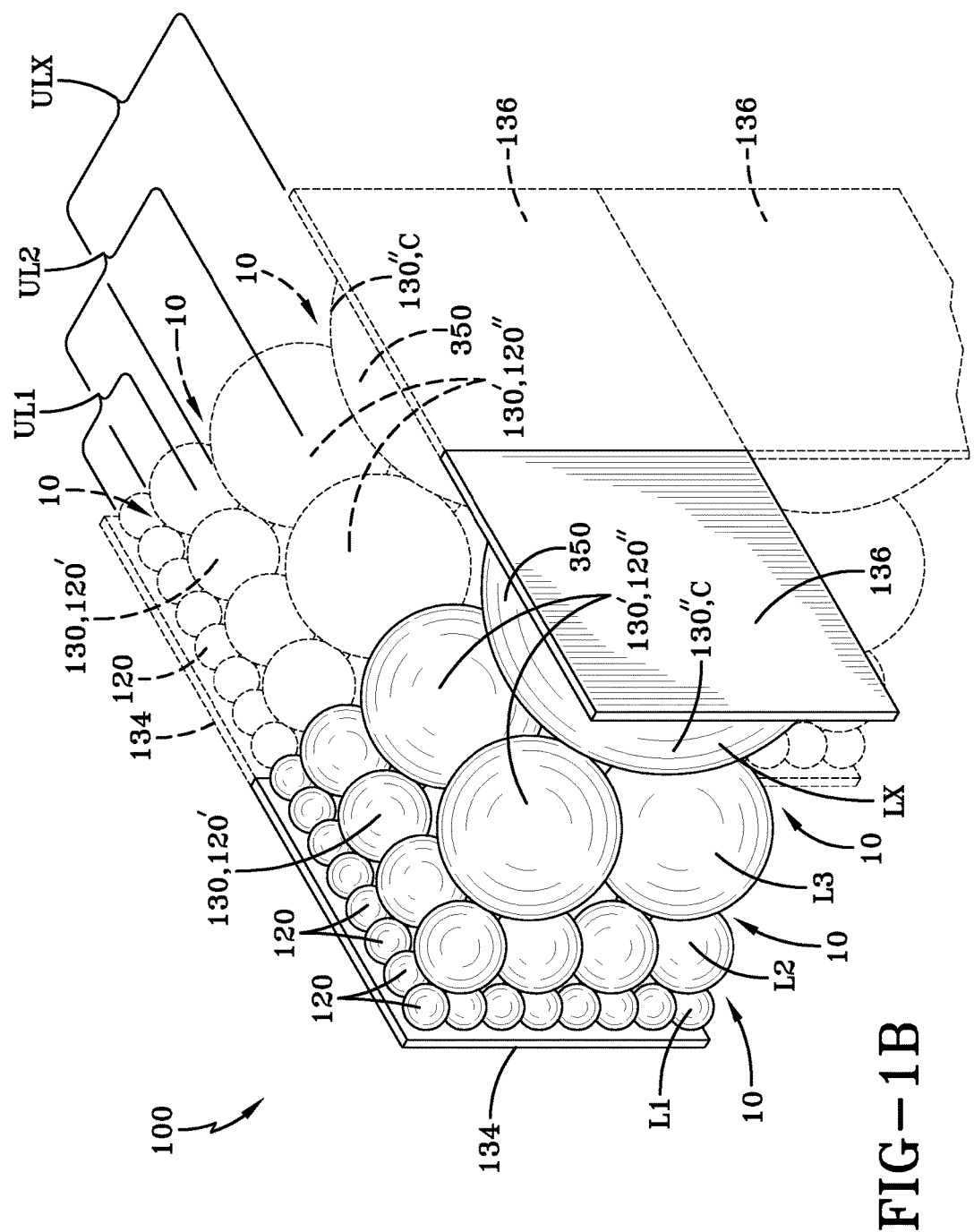
FIG. 1B is another perspective view of the ballistic material shown in FIG. 1A in accordance with the concepts of the present invention.
Figure 2:
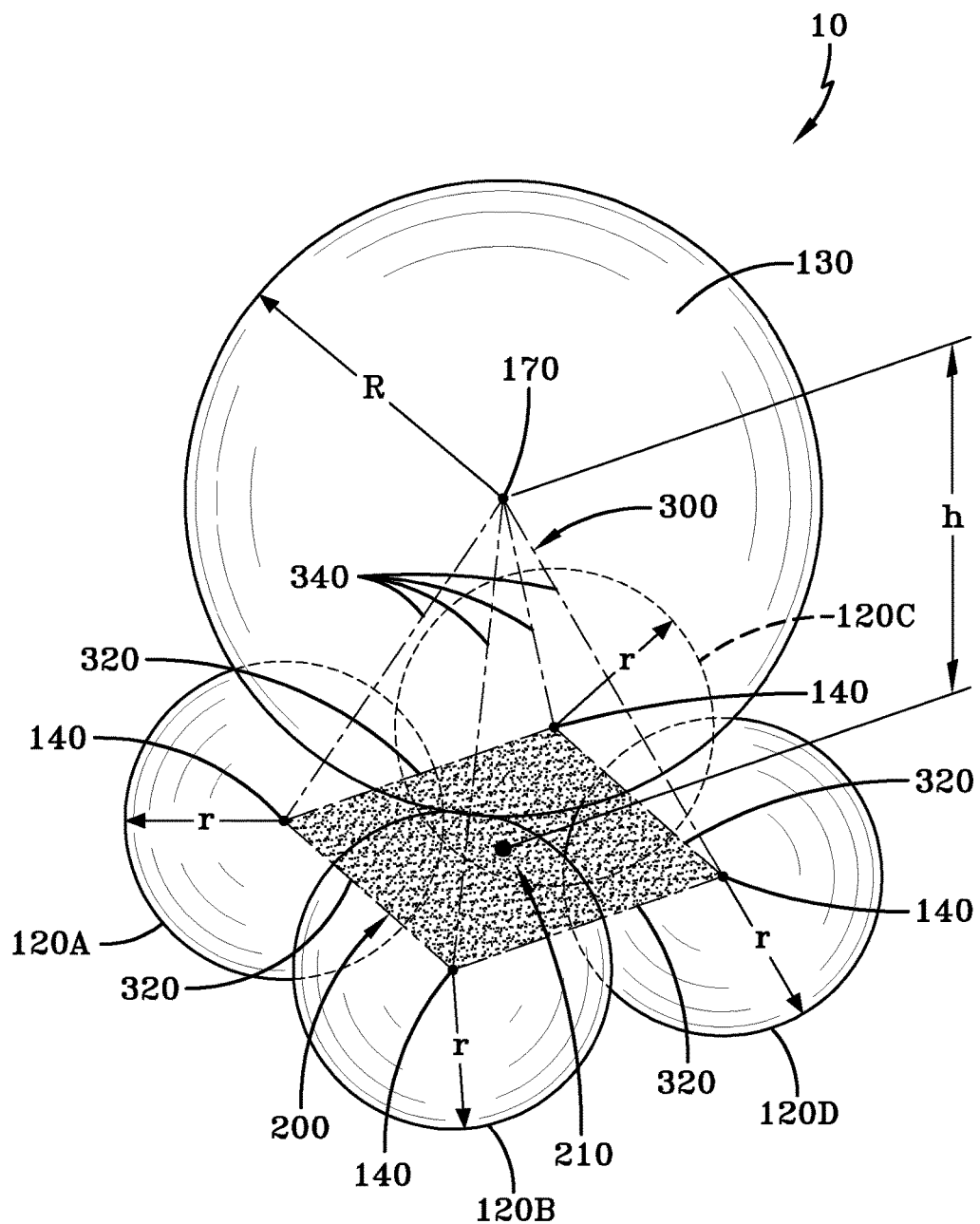
FIG. 2 is a perspective view of the square-based pyramid unit cell structure in accordance with the concepts of the present invention.

A ballistic material utilizing a three-dimensional, square-based pyramid unit cell (SBPUC) sphere structure 10 is referred to by numeral 100, as shown in FIGS. 1A-B of the drawings. In particular, the material 100 includes one or more sphere layers, designated as "L1-LX", that are formed from a plurality of SBPUCs 10, each of which comprise four base spheres 120A-D and a primary sphere 130 that are arranged to define an imaginary pyramid structure, as shown in FIG. 2. In addition, one or more layers of three-dimensional unit cells 10, designated as "UL1-ULX", may be arranged together between an outer substrate 134 and an inner substrate 136 in a variety of manners to form the layered or laminated ballistic material 100. In one aspect, the outer substrate 134 and the inner substrate 136 may be formed of any suitable material, such as metal, including but not limited to armor-grade steel, aluminum alloys, ceramic-coated steel, and the like, as well as polymeric materials, or any suitable resilient or flexible material, such as elastic rubber, or the like to form a tire or other structure requiring ballistic protection. In addition, the layers of unit cells UL formed of base spheres 120A-D and the primary spheres 130 may be arranged, such that each layer UL in the material 100 has differing physical properties from the other layers UL, such as decreasing/increasing sphere 120, 130 diameter, decreasing/increasing sphere 120, 130 thickness to achieve various material 100 designs and ballistic protection performance. Thus, the three-dimensional, square-based pyramid unit cells 100 provide a flexible platform in which ballistic materials can be formed for use in various applications and with various ballistics protection performance characteristics.

In particular, the square-based pyramid unit cell (SBPUC) 10, as shown in FIG. 2, comprises four base spheres 120A-D each having respective centers 140, and the primary sphere 130 having a center 170. The four base spheres 120A-D are arranged so that each one of the base spheres 120A-D is adjacent to and in contact with two other base spheres 120A-D. As such, the centers 140A-D of the base spheres 120A-D form corners of a square-shaped base 200 that define a single plane when connected. In one aspect, the base spheres 120A-D may be spaced apart from each other. In addition, the primary sphere 130 may also be spaced from the base spheres 120A-D, while still forming the square-based pyramid unit cell (SBPUC) 10. Due to the curvature and position of the base spheres 120A-D, a recess 210 is formed in the center of the arrangement of the four base spheres 120A-D. The primary sphere 130 is positioned so as to be partially received within the recess 210, such that the primary sphere is arranged adjacent to, and in contact with, each of the base spheres 120A-D. It should also be appreciated that in some embodiments, the center of the recess 210 is axially aligned with the center 170 of the primary sphere 130. In one aspect, the square-based pyramid unit cell 10 may be configured, such that the base spheres 120A-D and the primary sphere 160 are tightly packed together and in contact with each other.

The positional relationship of the four base spheres 120A-D and the primary sphere 130 serves to form the square-based pyramid unit cell (SBPUC) 10, which is symbolically represented by an imaginary pyramid 300, shown in FIG. 2. In particular, the imaginary pyramid 300 includes the square-shaped base 200, which is formed by base edges 320 that connect the centers 140 of each the base spheres 120A-D, whereby the centers 140 define the corners of the square base 200. In other words, the base edges 320 are connected at substantially right angles at the corners 140 to form the square-shaped base 200. However, it should be appreciated that the base edges 320 may be connected at the corners 140 at any suitable angle, such that when the corners 140 are connected by base edges 320, a parallelogram is formed. In addition, the imaginary pyramid of the square-based pyramid unit cell 10 includes a top apex that is defined by the center 170 of the primary sphere 130. The imaginary pyramid 300 of the pyramid unit cell 10 also includes four angled edges 340 that each connects one of the corners 140 of the base square 200 to the apex 170. Furthermore, the square-based pyramid unit cell (SBPUC) 10 is configured such that the four base spheres 120A-D each have a radius, denoted as "r", while the primary sphere 130 has a radius, denoted as "R"; where R=2*r for flat substrates 134, 136, and R>2*r for curved substrates 134, 136. In addition, the length of each of the base edges 320 of the square-shaped base 200 is "2r"; the length of the angled edges 340 of the imaginary pyramid is "R+r"; and the height, denoted as "h", of the imaginary pyramid 300 is "$\sqrt{7}*r$" in the case where the unit cell 10 is used with flat substrates 134, 136; while "h" of the imaginary pyramid 300 is "$\sqrt{R^2-r^2+2*r*R}$" in the case where the unit cell 10 is used with curved substrates 134, 136. It should also be appreciated that in other embodiments, the diameter of the base spheres 120 and the diameter of the primary sphere 130 in the unit cell 10 may be of any suitable diameter, so long as the primary sphere 130 is positioned in the recess 210 and in contact with or adjacent to each of the base spheres 120.

Thus, to form the ballistic material 100, a plurality of unit cells 10 are disposed and combined together in one or more layers between the spaced-apart outer substrate 134 and the inner substrate 136. The substrates 134, 136 may comprise any suitable planar or flat material, or curved material, which may be rigid or flexible. It should be appreciated that the outer substrate 134 is positioned so that it receives the initial or first impact of a ballistic projectile. In some embodiments, as a result of this layering of the unit cells 10 between the outer substrate 134 and the inner substrate 136, the primary spheres 130 that are proximate to either of the inner substrate 136 or the outer substrate 134 may comprise a partial or truncated sphere, referred to herein as a cap sphere, designated as "C", as shown in FIGS. 1A-B. That is, the cap sphere C is a special primary sphere 130 and may comprise a truncated sphere, such that the convex portion 350 of cap sphere C is proximate to the base spheres 120 of the unit cell 10 to which it is related, while the planar or flat portion 352 of the cap sphere C is adjacent to the inner or outer substrate 134, 136.

It should also be appreciated that the base and primary spheres 120, 130 of each unit cell 10 may be formed as solid spheres, hollow spheres, or a combination of both. As such, the spheres 120, 130 may comprise any suitable metal or polymeric material, such as stainless steel, low-carbon content steel, or any other metal material, or polymeric material, such as a resilient material, such as rubber. Furthermore, the spheres 120, 130 may be polymer-coated or fiber-encapsulated, for example. In addition, the spheres 120, 130 are configured to have a hardness that optimizes their energy-dispersion properties. As such, the material used to form the spheres 120, 130 may be selected to optimize this energy-dispersion property. In one aspect, the material used to form the spheres 120, 130 may be selected, such that the ratio of the hardness of the spheres 120, 130 to the hardness of the incoming projectile is about 0.31, such as 0.26 for example.

It should also be appreciated that the first layer of spheres L that is adjacent to the outer substrate 134 is comparable to the diameter of the incoming projectile. For example, the ratio of the diameter of the first layer of spheres L adjacent to the outer substrate 134 to the diameter of the projectile may be within a range from about 0.9 to 1.1, for example.

As previously discussed, in some embodiments multiple unit cells 10 may be combined in an ordered arrangement to form one or more unit cell layers between the substrates 134, 136. For example, as shown in FIGS. 1A-B, each layer of one or more unit cells 10 is designated as UL1, UL2 . . . , ULX, whereby the base spheres 120 and the primary spheres 130 form various sphere layers, designated as L1, L2, . . . LX. As such, the multiple layers of spheres L1-LX, which form one or more layers of unit cells UL1-ULX, may be disposed between the substrates 134 and 136 in various configurations. For example, the one or more layers of unit cells UL may be arranged in a configuration, whereby the base spheres 120 are positioned adjacent to one or both substrates 134, 136. In addition, in other embodiments the one or more layers of unit cells UL may be arranged in a configuration, whereby the primary spheres 130 are positioned adjacent to one or both substrates 134, 136. It should also be appreciated that in a layered configuration, the primary spheres 130 of one sphere layer serves as base spheres 120 of a sphere layer in an adjacent sphere layer. Furthermore, the adjacent sphere layers may also share one or more common layers of base spheres, or primary spheres.

Thus, in some instances the primary spheres 130 serve as both base spheres 120 for some unit cell layers UL1, UL2, ... ULX while also serving as primary spheres 130 for other unit cell layers UL2, UL3, ... ULX.

Figure 3:
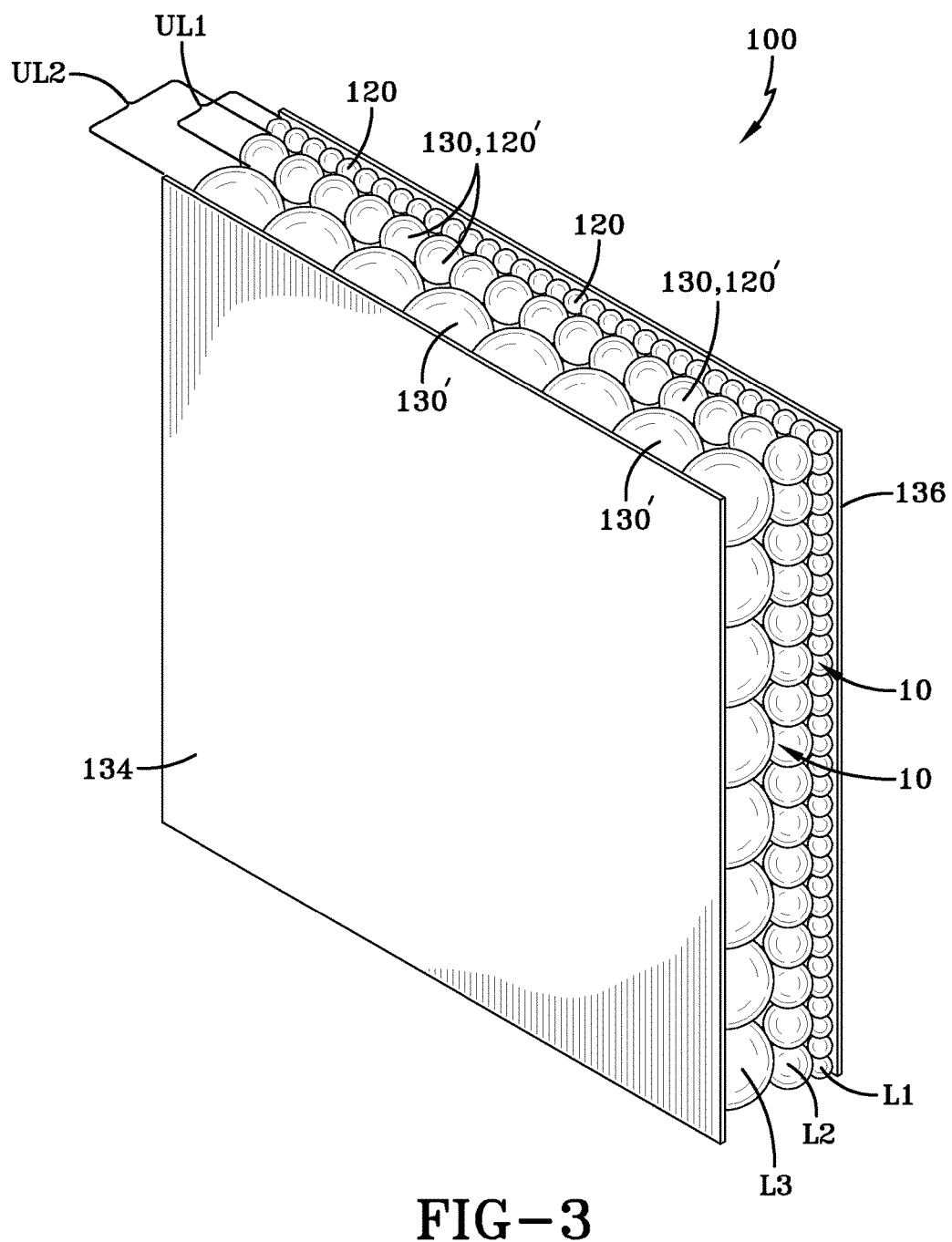
FIG. 3 is a perspective view of the ballistic material using a plurality of layered square-based pyramid unit cells in accordance with the concepts of the present invention.

For example, FIG. 3 shows the material 100 formed from multiple sphere layers L1-L3 that are formed by unit cell layers UL1 and UL2. As such, the first unit cell layer UL1 comprises base spheres 120 in sphere layer L1 and primary spheres 130 in sphere layer L2. The second unit cell layer UL2 comprises base spheres 120' of sphere layer L2, which are formed of primary spheres 130 of the first unit cell layer UL1, and the primary spheres 130' in the third sphere layer L3. Thus, beginning with the layer of spheres adjacent to the inner substrate 136, the first layer of spheres, L1, includes base spheres 120 of unit cell layer UL1; the second layer of spheres L2, includes primary spheres 130 of unit cell layer UL1, which also serve as base spheres 120' of unit cell layer UL2; and the third layer of spheres, L3, includes primary spheres 130', which serve as the primary spheres of unit cell layer UL2. In other words, unit cell layer UL1 includes base spheres 120 and primary sphere 130; and unit cell layer UL2 includes the base spheres 120' and primary sphere 130'. Thus, the primary spheres 130 of each unit cell layer UL1 is shared with unit cell layer UL2 and serves as its base sphere 120'. Furthermore, the diameters of the spheres 120, 130 in each sphere layer L1-L3 increases in size moving from the inner substrate 136 to the outer substrate 134.

It should be appreciated that in other embodiments, the material 100 utilizes unit cells 10 in which the base spheres 120A-D and primary sphere 130 in each layer of unit cells UL have a diameter that progressively decreases or increases in size when moving from the outer substrate 134 to the inner substrate 136.

Figure 4:
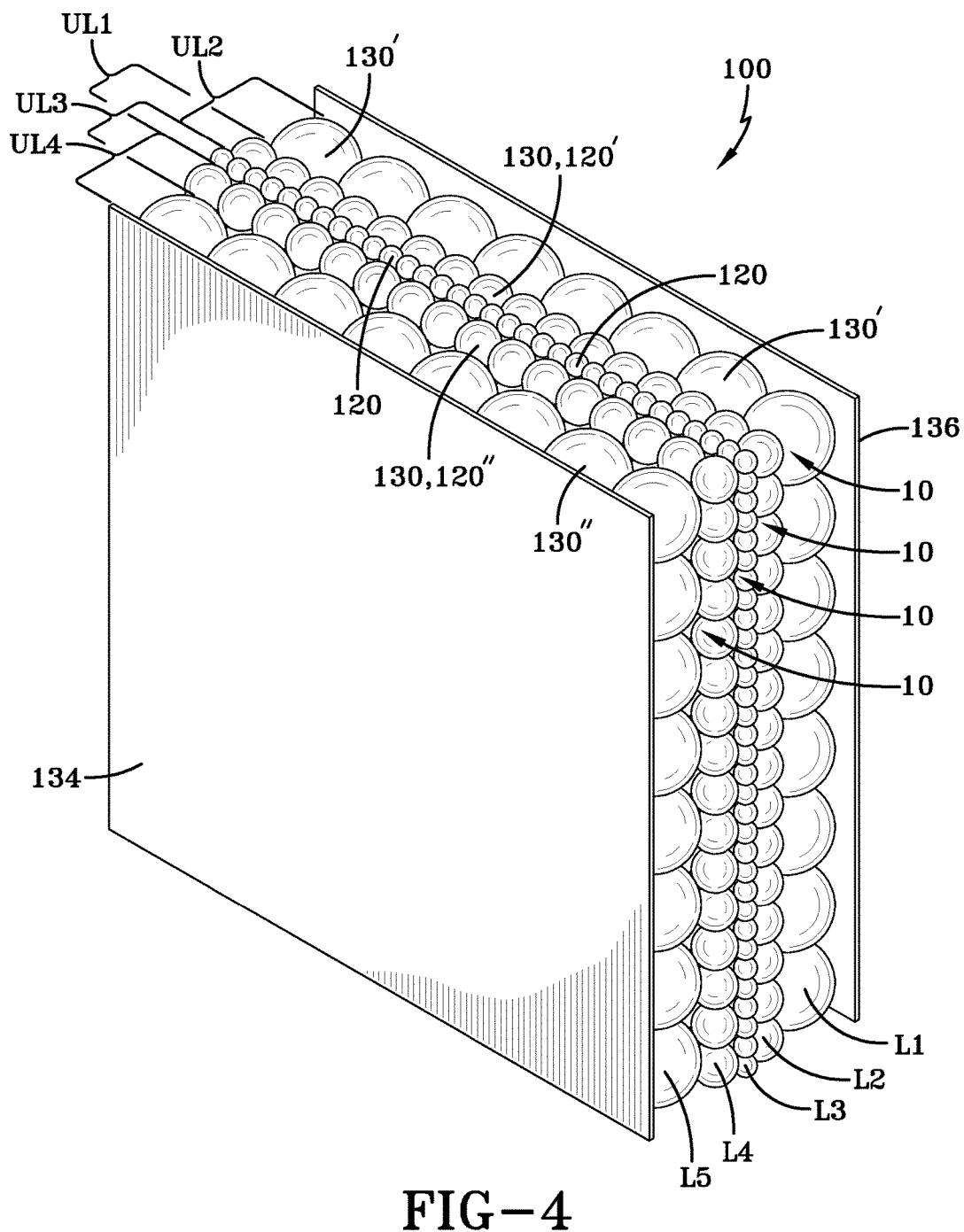
FIG. 4 is a perspective view of an alternative ballistic material that utilizes layers of square-based pyramid unit cells, which utilize a shared layer of base spheres in accordance with the concepts of the present invention.

In another embodiment, the material 100' may utilize a plurality of unit cell layers UL1-UL4 that are configured, such that the sphere layers L1 and L5, which comprise primary spheres 130, are positioned adjacent to the respective inner substrate 136 and the outer substrate 134, as shown in FIG. 4. That is, such a configuration comprises four unit cell layers UL1, UL2, UL3 and UL4 that are formed of five layers of spheres, L1, L2, L3, L4 and L5, whereby sphere layers L1 and L5 comprise primary spheres 130. In addition, sphere layer L3, which is shared by two unit cell layers UL1 and UL3 to be discussed, comprises base spheres 120. As such, the material 100' includes a first unit cell layer UL1, which comprises base spheres 120, formed by sphere layer L3, and primary spheres 130 of the second sphere layer L2. The second unit cell layer UL2 comprises base spheres 120' of sphere layer L2, which are formed of primary spheres 130 of the first unit cell layer UL1, and primary spheres 130' of the first sphere layer L1. As such, the second unit cell layer UL2 is proximate to the inner substrate 136, such that the primary spheres 130' of the second unit cell layer UL2 (first sphere layer L1) are positioned adjacent to the inner substrate 136. In addition, a third unit cell layer UL3 comprises base spheres 120 of the third sphere layer L3 and primary spheres 130 of a fourth sphere layer L4. The fourth unit cell layer UL4 comprises base spheres 120" of the fourth sphere layer L4, which are formed of primary spheres 130 of the third unit cell layer UL3, and primary spheres 130" in a fifth sphere layer L5. As such, the fourth unit cell layer UL4 is proximate to the outer substrate 134, such that primary spheres 130" of the fourth unit cell layer UL4 (fifth sphere layer L5) are positioned adjacent to the outer substrate 134. As a result of the configuration of the material 100', the diameter of the sphere layers L1-L5 decreases and then increases in size when moving from the inner substrate 136 to the outer substrate 134, as shown in FIG. 4.

Figure 5:
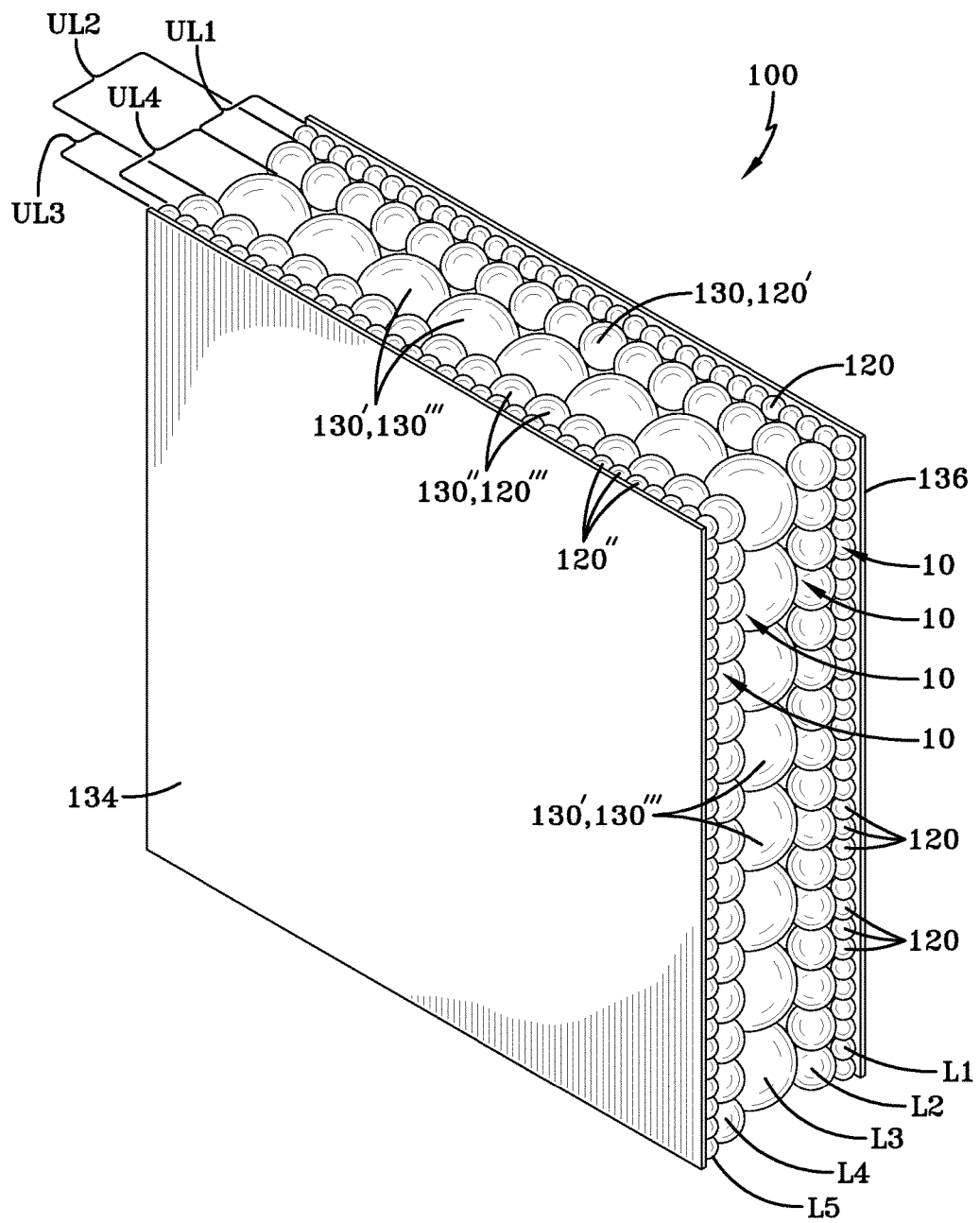
FIG. 5 is a perspective view of another alternative ballistic material that utilizes layers of square-based pyramid unit cells, which utilize a shared layer of primary spheres in accordance with the concepts of the present invention.

In yet another embodiment, the material 100" may utilize a plurality of unit cell layers UL1-UL4 that are configured such that the sphere layers L1 and L5, which comprise base spheres 120, are positioned proximate to the respective inner substrate 136 and the outer substrate 134, as shown in FIG. 5. That is, such a configuration comprises four unit cell layers UL1, UL2, UL3 and UL4 that are formed of five layers of spheres, L1, L2, L3, L4 and L5, whereby sphere layers L1 and L5 are positioned adjacent to the inner substrate 136 and the outer substrate 134 respectively, and comprise base spheres 120. In addition, sphere layer L3, which is shared by two unit cell layers UL2 and UL3 to be discussed, comprises primary spheres 130. As such, the material 100 includes a first unit cell layer UL1, positioned adjacent to the inner substrate 136, which comprises base spheres 120 of sphere layer L1, and primary spheres 130 of sphere layer L2. The second unit cell layer UL2 comprises base spheres 120', which are formed of the primary spheres 130 of sphere layer L2 of the first unit cell layer UL1, and primary spheres 130' of sphere layer L3. In addition, a third unit cell layer UL3 is positioned adjacent to the outer substrate 134, which comprises base spheres 120" of the fifth sphere layer L5, and primary spheres 130" of sphere layer L4. A fourth unit cell layer UL4 comprises base spheres 120''', which are formed of the primary spheres 130" of the third sphere layer L3, and primary spheres 130''', which are formed of the primary spheres 130' of layer L3 of the second unit cell layer UL2. As such, the diameter of the sphere layers L1-L5 increases and then decreases in size when moving from the inner substrate 136 to the inner substrate 134, as shown in FIG. 5. In one aspect, the base spheres 120A-D and the primary sphere 130 may both be formed of materials having the same hardness or different hardness. For example, the base spheres 120 and the primary spheres 130 may have a hardness level in which the yield stress ratio (a) is about 1.5, although other hardness levels may be used.

In other embodiments, the density of the spheres 120 and 130 may vary gradually within the structure of the material 100, 100', 100". In one aspect, the material 100, 100', 100" may be configured such that the hardest layer of spheres forms the unit cell layers UL that are the first and the last layers to be impacted by a projectile, while the softest layer of spheres form the layers in the middle of the material 100, 100', 100".

In some embodiments, sphere 120, 130 diameters may increase gradually in different layers, such that the smaller spheres impacted by a projectile proximate to the outer substrate 134 can be obstructed gradually and completely from the larger spheres proximate to the inner substrate 136 of the material 100, 100', 100".

In other embodiments, the sphere diameter of the base spheres 120 and the primary sphere 130 in the layer of spheres adjacent to the outer layer 134 of the material 100, 100', 100", may be made larger than the length of the projectile to provide enough room to allow the projectile to tumble after penetrating through the first and second layers of spheres.

In another aspect, the performance of the ballistic material 100, 100', 100" may be increased or enhanced by incorporating additional spheres into the material 100, 100', 100", such as by placing the spheres between existing spheres 120, 130 or by adding additional layers of spheres in any desired arrangement and configuration.

Figure 6A:
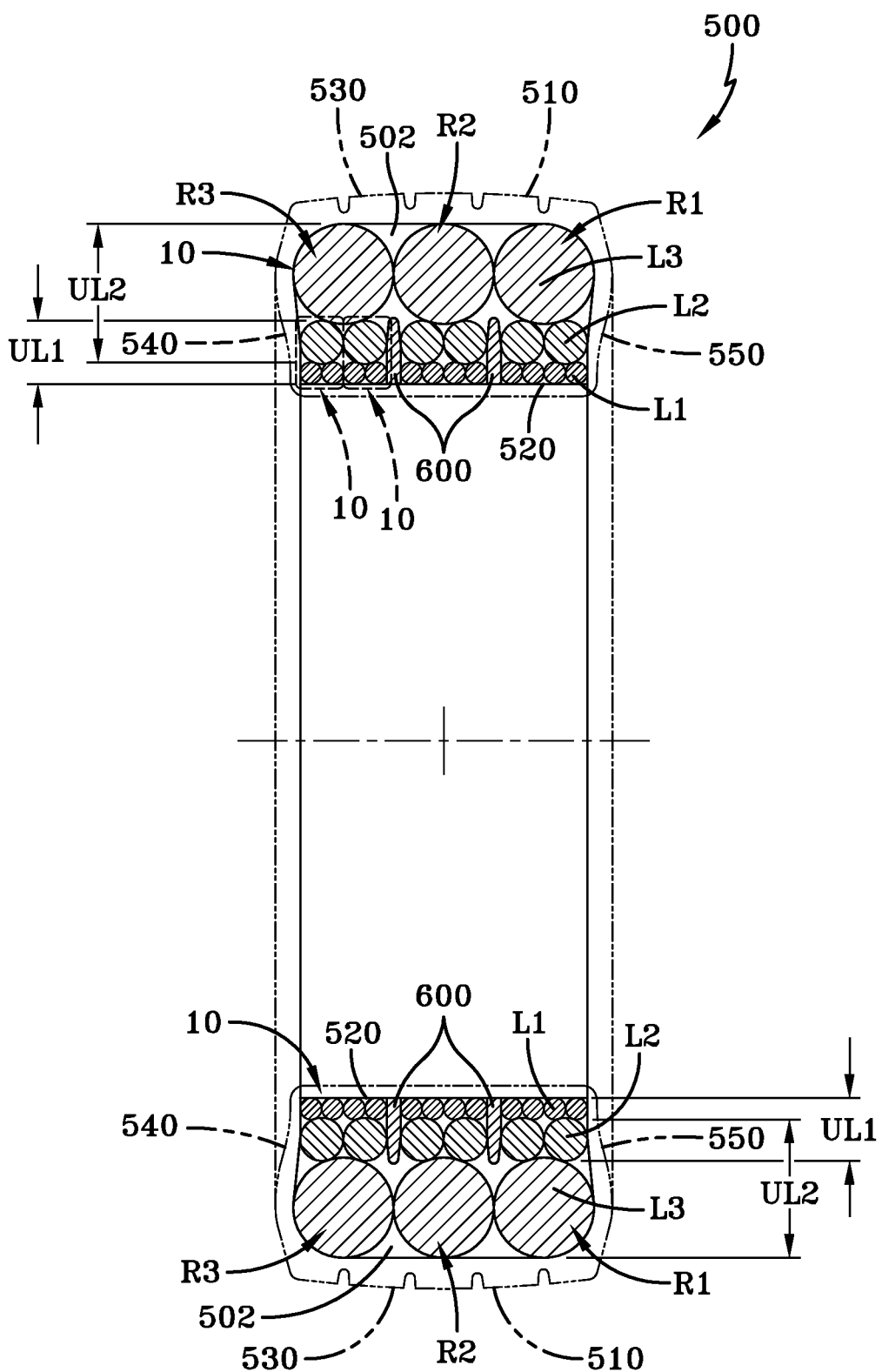
FIG. 6A is a cross-sectional view of a tire that incorporates the ballistic material that utilizes a plurality of rings of layered square-based pyramid unit cells in accordance with the concepts of the present invention.
Figure 6B:
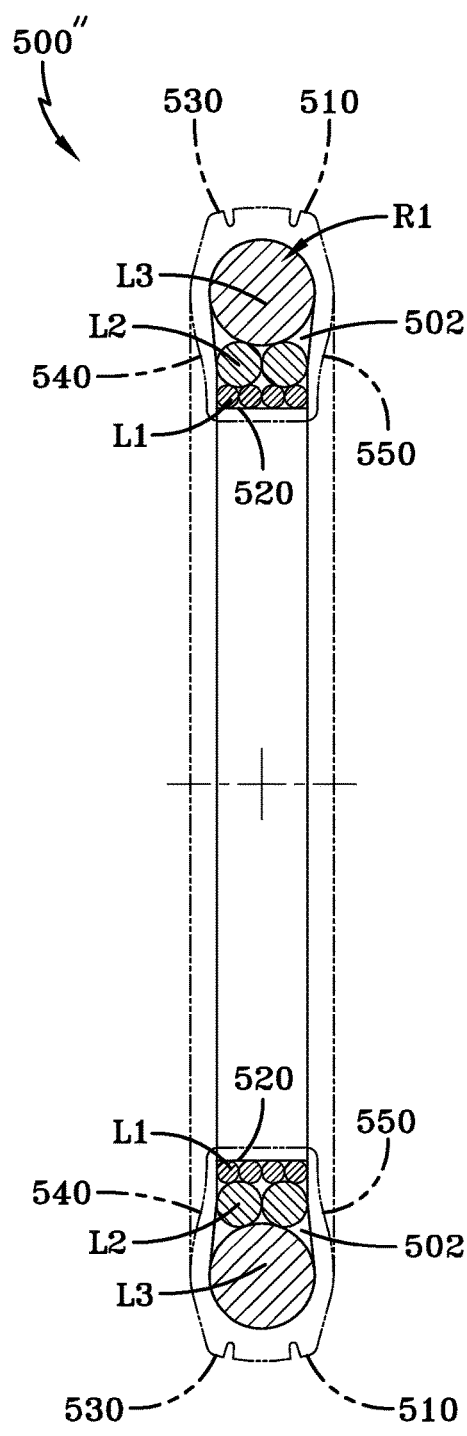
FIG. 6B is a cross-sectional view of a single ring of layered square-based pyramid unit cells in accordance with the concepts of the present invention.
Figure 6C:
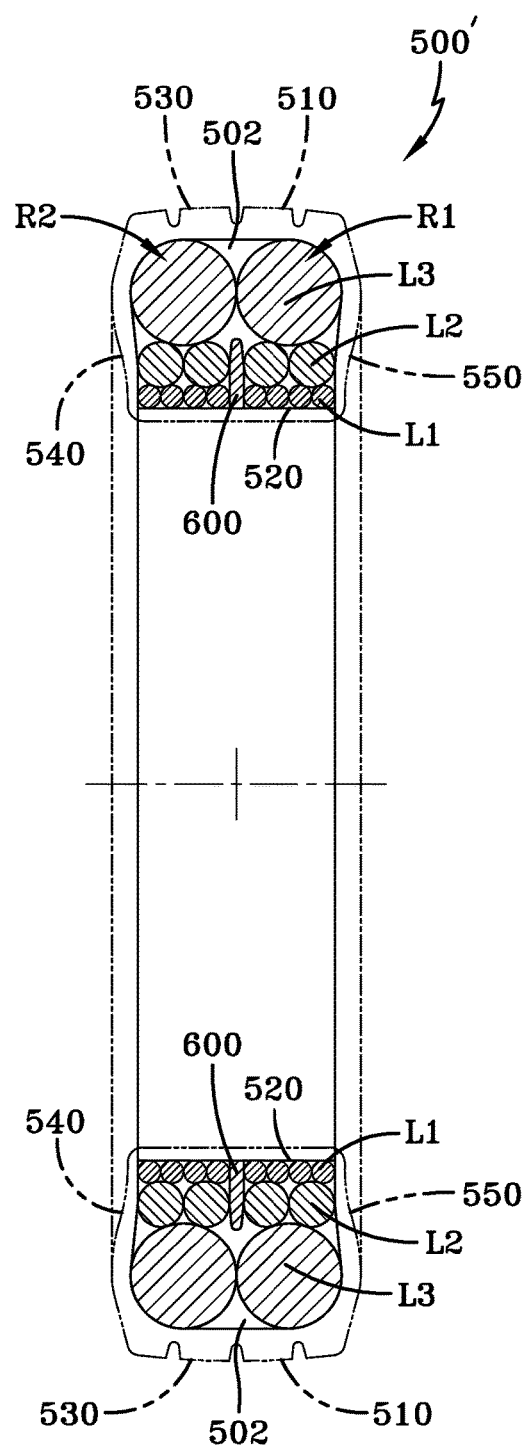
FIG. 6C is a cross-sectional view of a pair of rings of layered square-based pyramid unit cells in accordance with the concepts of the present invention.

In another embodiment, the square-based pyramid unit cell (SBPUC) 10 may be utilized to provide ballistics protection to a tire 500, as shown in FIGS. 6A-C. In other words, the three-dimensional unit cell 10 may be used to provide the tire with run-flat capabilities, which is resistant to puncture from ballistics projectiles or any puncturing device. Thus, a plurality of unit cells 10 may be retrofit to the existing tire 500 or incorporated into the design of the tire 500, whereby the hollow spheres 120, 130, elastic rubber bands and glue may be used for position-setting of the unit cells 10. It should be appreciated that the use of elastic rubber bands and glue prevents lateral motion of the base spheres 120 between the rings R of the stacked spheres 120, 130, which will be discussed in further detail below. It should also be appreciated that in other embodiments, the unit cells 10 may be formed integrally with structure of the tire 500. In one aspect, the unit cells 10 may be made integral with the tire 500 by using 3D printing technology for example, as well as any other suitable manufacturing technique. In one aspect, the unit cells 100 may be formed from resilient material, such as elastic rubber that is also used to form the tire 500.

Figure 7:
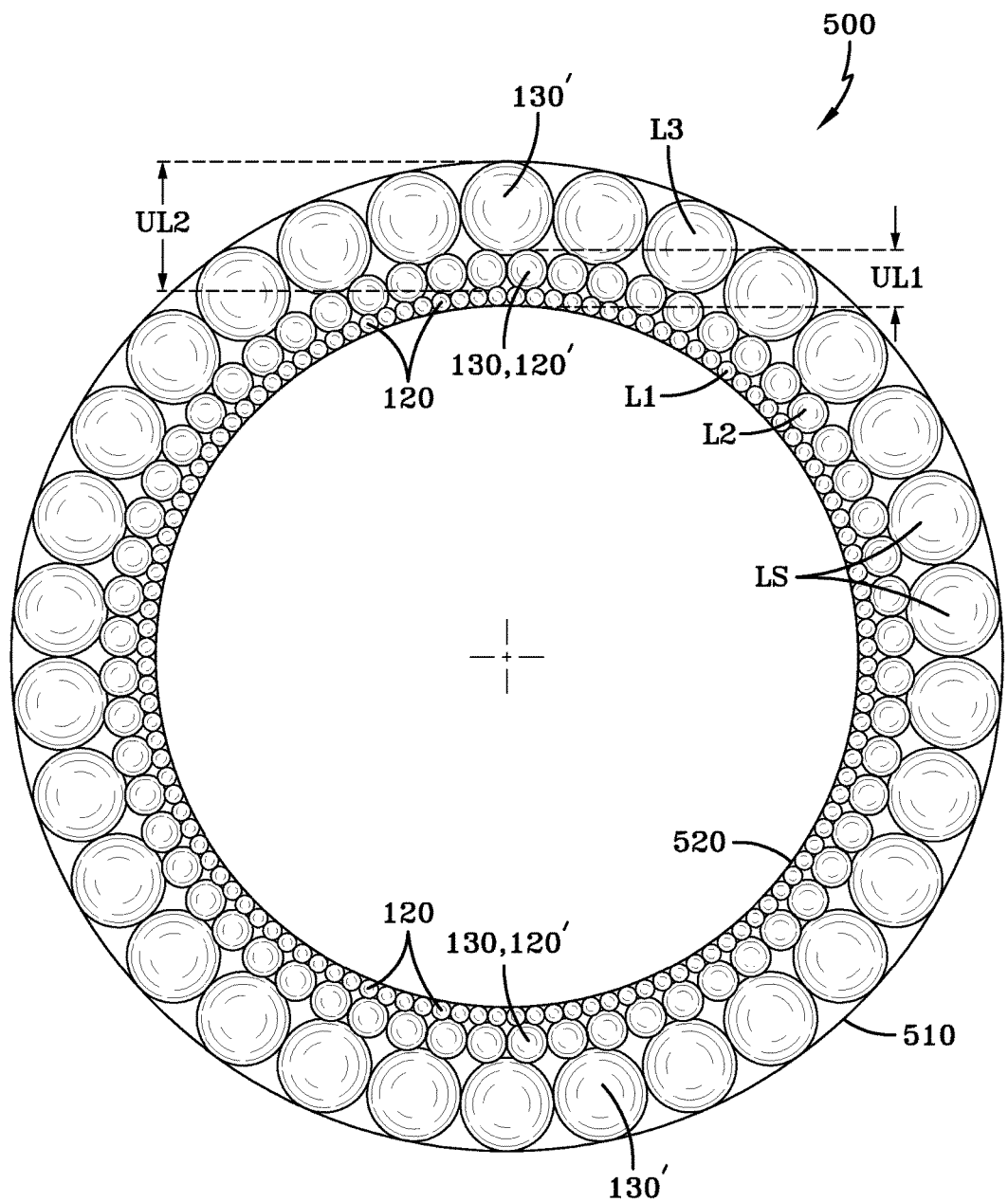
FIG. 7 is a cross-sectional view of one of the rings shown in FIGS. 6A-C in accordance with the concepts of the present invention.
Figure 8:
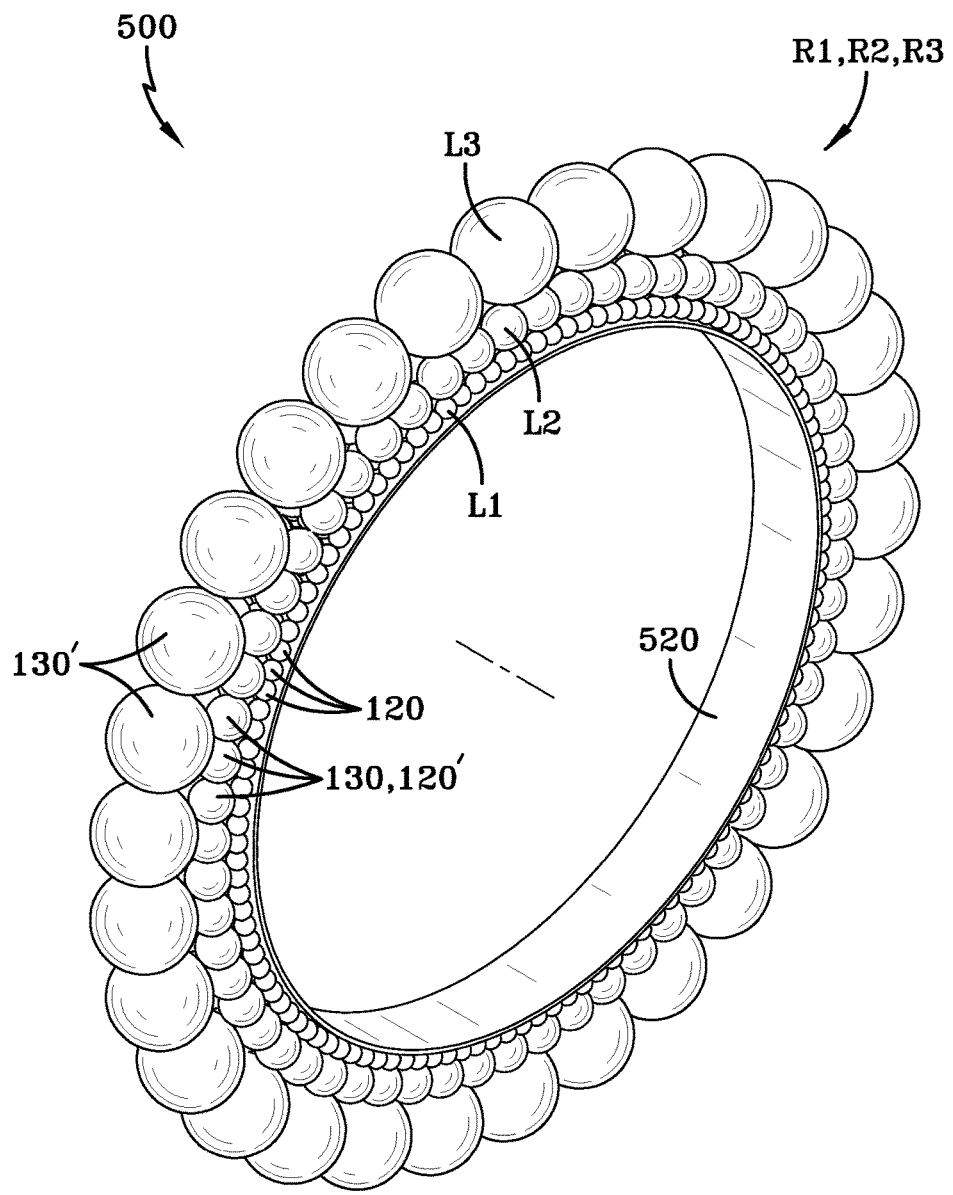
FIG. 8 is a perspective view of a single ring of layered square-based pyramid unit cells in accordance with the concepts of the present invention.

As such, a plurality of sphere layers L1-LX, which are formed from unit cell layers UL1-ULX may be incorporated into the design of the tire 500. In particular, the unit cell layers UL1-ULX are positioned in a cavity 502 that is defined between an outer curved surface or substrate 510 and an inner curved surface or substrate 520 of the tire 500, as shown in FIG. 6A. It should be appreciated that the substrates 510 and 520 are substantially equivalent to that of substrates 134 and 136 previously discussed. In addition, the plurality of unit cells 10 forming each layer UL1-ULX are also configured as rings of stacked spheres, designated as "R", shown clearly in FIG. 8, which extend laterally across the width of the tire 500 to support the tire tread 530 and to also support each sidewall 540 and 550. It should be appreciated that the width of the rings R may be formed of any desired number of unit cells, while the height of the rings R may be any desired number of unit cell layers UL1-ULX high. For example, the width of rings R1, R2 and R3, shown in FIGS. 6A-C, are each two unit cells 10 wide and are two unit cell layers UL in height, as shown in FIGS. 7 and 8. Thus, the plurality of sphere rings R1-RX, which are formed of one or more sphere unit cells UL1-ULX, as shown in FIG. 6A circumscribe the inner surface 520 of the tire 500. For example, the tire 500 may utilize three sphere rings R1-R3, as shown in FIG. 6A. However, the tire 500 may be configured to utilize any number of sphere rings R, such as one sphere ring R1 as shown in FIG. 6B or two sphere rings R1 and R2 as shown in FIG. 6C, for example.

Furthermore, one or more separators 600, which radially extend from the inner surface 520 of the tire 500, may be provided to separate adjacent sphere rings R, when two or more sphere rings R are utilized by the tire 500. In one aspect, the separator 600 may be formed of the same material as the tire 500 or of any other suitable material. The separator 600 serves to prevent the lateral motion of the base spheres 120, which belong to two adjacent unit cell layers UL1 and UL2. Furthermore, when the unit cells 10 are arranged between two curved substrates 134, 136 or in an annular space, in the case of the tire 500, the diameter formed from the addition of the two base spheres 120 is less than the diameter of the primary sphere 130. This causes the formation of extra space, which results in a lateral gap between the base spheres 120 of two adjacent rings R, and as a result, the separator 600 is utilized to fill the gap between rings R.

In one aspect, the tire 500 may utilize two layers UL1 and UL2 of unit cells 10, which are formed by three sphere layers L1-L3, as shown in FIGS. 6A-C and 7. As such, the diameter of the layers of spheres L1, L2 and L3 progressively increase in size from the inner surface 520 to the outer surface 510 of the tire 500. However, it should be appreciated that the diameter of the spheres in each layer L1, L2, and L3 may take on any desired size. Furthermore, it should be appreciated that the tire 500 may incorporate any number layers L of spheres or number of layers of unit cells UL to achieve the desired level of ballistic protection and run-flat performance.

It should be appreciated that the sphere angle is the radial angle between two adjacent outermost largest diameter spheres 120, 130, designated as "LS" in FIG. 7, which are adjacent to the outer surface 510; and it is this sphere angle that determines the size of the tire 500. For example, sphere layer L3 in FIG. 7 contains the contains primary spheres 130, which are the outermost largest diameter spheres LS, and are adjacent to the outer surface 510; and it is the sphere angle between these adjacent spheres LS that determines the size of the tire 500. As such, the smaller the sphere angle, the bigger the tire 500. Thus, a larger tire 500 is able to include a larger number of spheres, and have a higher ballistic protection performance, than a smaller tire 500.

Based on the foregoing, the advantages of the present invention are readily apparent. The main advantage of this invention is to provide a ballistic material that utilizes a three-dimensional, square-based pyramid unit cell (SBPUC) sphere structure in which the energy associated with an incoming ballistic projectile is at least partially dispersed toward the perimeter of the spheres forming the structure. Yet another advantage of the present invention is that the performance of the ballistic material that utilizes a three-dimensional, square-based pyramid unit cell (SBPUC) sphere structure that is characterized by increasing sphere and cap diameters, decreasing sphere thickness, and increasing cap thickness.

Thus, it can be seen that the objects of the present invention have been satisfied by the structure and its method for use presented above. While in accordance with the Patent Statutes, only the best mode and preferred embodiment has been presented and described in detail, it is to be understood that the present invention is not limited thereto or thereby. Accordingly, for an appreciation of the true scope and breadth of the invention, reference should be made to the following claims.

What is claimed is:

1. A ballistic material comprising:
    a first substrate layer configured to receive a projectile;
    a second substrate layer; and
    a first layer including at least one layer of a plurality of unit cells positioned between said first substrate layer and said second substrate layer, each said unit cell comprising:
        four base spheres, each said base sphere being positioned adjacent to two other said base spheres, such that a recess is defined by said four base spheres; and
        a primary sphere positioned partially within said recess and adjacent to each said four base spheres;
    a second layer of a plurality of truncated cap spheres each having a planar surface and a convex surface, said layer of cap spheres positioned between said at least one layer of unit cells and one of said first or second substrate layers, wherein said planar surface of said cap spheres is adjacent to one of said first or second substrates layers;

wherein one or more of said spheres of said first layer are formed of a material having a first density, and said spheres of said second layer are formed of a material having a second density, wherein said first density and said second density are different.

2. The ballistic material of claim 1, wherein a center axis of said recess extends through a center of said primary sphere.

3. The ballistic material of claim 2, wherein each center of said four base spheres defines a corner of a square base.

4. The ballistic material of claim 3, wherein a center of said primary sphere defines an apex of a pyramid when said corners of said square base are connected to said apex.

5. The ballistic material of claim 4, wherein said first and second substrate layers are flat, and said pyramid has a height that is equal to $\sqrt{7}*r$, where r is a radius of said base spheres, and a radius of said primary spheres, R, is equal to 2*r.

6. The ballistic material of claim 4, wherein said first and second substrate layers are curved, and said pyramid has a height that is equal to $\sqrt{R^2-r^2+2*r*R}$, where r is a radius of said base spheres, and a radius of said primary spheres, R is greater than 2*r.

7. The ballistic material of claim 1, wherein said first substrate layer and said second substrate layer are planar.

8. The ballistic material of claim 1, wherein said first substrate layer and said second substrate layer are flexible.

9. The ballistic material of claim 1, wherein said first substrate comprises a tread of a tire, and said second substrate comprises an inner surface of said tire, which is connected to a first and a second sidewall of said tire.

10. The ballistic material of claim 9, wherein one or more spacers radially extend from said inner surface of said tire and are positioned between at least two adjacent unit cells.

11. The ballistic material of claim 1, wherein a radius of said primary sphere is at least twice that of a radius of one of said base spheres.

12. The ballistic material of claim 1, wherein at least one layer of a plurality of unit cell layers share at least said base spheres or said primary spheres with another unit cell layer.

13. The ballistic material of claim 1, wherein said plurality of unit cells in one layer is larger than said plurality of unit cells in an adjacent layer.

14. The ballistic material of claim 1, wherein said plurality of unit cells in one layer is smaller than said plurality of unit cells in an adjacent layer.

15. The ballistic material of claim 1, wherein said convex surface of each said cap spheres is positioned partially within a recess defined by four said primary spheres in which each one of said four primary spheres is adjacent to two other said primary spheres, and said convex surface positioned adjacent to said four primary spheres.

16. The ballistic material of claim 15, wherein a center axis of said recess defined by four adjacent said primary spheres extends through a center of said cap sphere positioned partially therewithin.

17. The ballistic material of claim 1, wherein one or more of said base spheres, said primary spheres or said cap spheres are hollow or solid.

18. The ballistic material of claim 1, wherein said first density transitions to second density gradually.

19. A ballistic material comprising:
a first substrate layer configured to receive a projectile;
a second substrate layer;
a plurality of sphere layers, wherein each said layer includes a plurality of spheres, with each one of said spheres being positioned adjacent to two other spheres, such that a recess is defined by a group of four said spheres, wherein said plurality of spheres of one of layer of spheres is positioned within said recess of another layer of said spheres; and
a layer of a plurality of truncated cap spheres each including a convex surface and a planar surface, such that said convex surface is positioned within said recess of one of said plurality of layers of spheres, with said convex surface being adjacent to said group of four said spheres, and said planar surface positioned adjacent to one of said first or second substrate layers,
wherein said spheres of each said plurality of sphere layers is formed of a material, such that said material of each one of said plurality of sphere layers has a different density, and said plurality of truncated cap spheres is formed of a material having a density that is different from the densities of said plurality of sphere layers.

20. The ballistic material of claim 19, wherein a radius of said spheres of each said plurality of sphere layers, and a radius of said spheres of said layer of cap spheres are each different.

21. The ballistic material of claim 19, wherein a radius of said spheres in one of said plurality of sphere layers that is distal to said layer of cap spheres is smaller than a radius of said spheres in any other said sphere layer and said cap sphere layer.

* * * * *